3,816,447
Patented June 11, 1974

3,816,447
N¹-SUBSTITUTED INDAZOLES
Pasquale P. Minieri, Woodside, N.Y., assignor to Tenneco Chemicals, Inc.
No Drawing. Continuation-in-part of application Ser. No. 201,194, Nov. 22, 1971, now abandoned. This application Feb. 7, 1972, Ser. No. 224,286
Int. Cl. C07d 49/18
U.S. Cl. 260—310 C 9 Claims

ABSTRACT OF THE DISCLOSURE

Compounds that have the structural formula

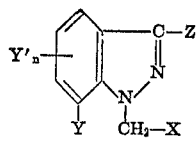

wherein X represents —OR, halogen, or thiocyanato; Y represents halogen, nitro, —SO$_2$R, acoyl, acoylamino, lower alkyl, lower alkoxy, carboalkoxy, or trihalomethyl; Y' represents halogen, nitro, —SO$_2$R, acoyl, acoylamino, aroylamino, lower alkyl, lower alkoxy, carboalkoxy, trihalomethyl, alkyleneimino, or (halobenzylidene)amino; Z represents hydrogen, halogen, acoylamino, or alkyleneimino; R represents hydrogen, alkyl, haloalkyl, phenyl, or substituted phenyl wherein the substituent is halogen, hydroxyl, alkyl, or nitro; and n represents a number in the range of zero to three are biocides that are of value in the preservation of aqueous compositions that are subject to deterioration resulting from bacterial action. Illustrative of these compounds is N¹-hydroxymethyl-5,7-dichloroindazole.

---

This is a continuation-in-part of my copending application Ser. No. 201,194, which was filed on Nov. 22, 1971, now abandoned.

This invention relates to certain N¹-substituted indazoles and to their use a preservatives for aqueous compositions that are ordinarily subject to deterioration resulting from microbial action.

In accordance with this invention, it has been found that certain N¹-substituted indazoles have unusual and valuable activity as preservatives for aqueous compositions, such as latex paints. These compounds may be represented by the structural formula

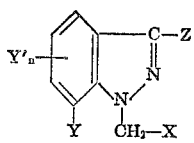

wherein X represents —OR, chlorine, bromine, fluorine, iodine, or thiocyanato; Y represents chlorine, bromine, fluorine, iodine, nitro, —SO$_2$R, acoyl, acoylamino, alkyl having 1 to 4 carbon atoms, alkoxy having 1 to 4 carbon atoms, carboalkoxy, trifluoromethyl, trichloromethyl, tribromomethyl, or triiodomethyl; Y' represents chlorine, bromine, fluorine, iodine, nitro, —SO$_2$R, acoyl, acoylamino, aroylamino, alkyl having 1 to 4 carbon atoms, alkoxy having 1 to 4 carbon atoms, carboalkoxy, trifluoromethyl, trichloromethyl, tribromomethyl, triiodomethyl, (chlorobenzylidene)amino, (bromobenzylidene)amino, or alkyleneimino having 1 to 8 carbon atoms; Z represents hydrogen, chlorine, bromine, fluorine, iodine, acoylamino, or alkyleneimino having 1 to 8 carbon atoms; R represents hydrogen, alkyl having 1 to 12 carbon atoms, chloroalkyl having 1 to 12 carbon atoms, bromoalkyl having 1 to 12 carbon atoms, phenyl, chlorophenyl, hydroxyphenyl, alkylphenyl, or nitrophenyl; and n is a number in the range of zero to three. Illustrative of these compounds are the following:

N¹-hydroxymethyl-3,7-dichloroindazole;
N¹-hydroxymethyl-4,5,6,7-tetrachloroindazole;
N¹-hydroxymethyl-3,5,7-tri(acetamino)indazole;
N¹-bromomethyl-3,6,7-tribromoindazole;
N¹-chloromethyl-5,6,7-trinitroindazole;
N¹-chloromethyl-7-trifluoromethylindazole;
N¹-thiocyanatomethyl-4-methyl-7-butylindazole;
N¹-chloromethyl-4,7-dimethoxyindazole;
N¹-iodomethyl-5,7-di(butylsulfonyl)indazole;
N¹-methoxymethyl-3-methyleneimino-7-acetylindazole;
N¹-chlorobutoxymethyl-6-benzamino-7-chloroindazole;
N¹-3-chloro-6-(3,4-dichlorobenzylidene)amino-7-nitroindazole; and
N¹-thiocyanatomethyl-3,6-dipiperidino-1-chloroindazole.

Particularly effective as biocides for aqueous compositions are the compounds having the structural formula

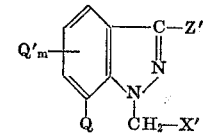

wherein X' represents hydroxyl, chlorine, bromine, fluorine, iodine, or thiocyanato; Z' represents hydrogen, chlorine, bromine, fluorine, or iodine; Q and Q' each represents chlorine, bromine, fluorine, iodine, or nitro; and m represents a number in the range of zero to one. These preferred compounds include:

N¹-hydroxymethyl-7-chloroindazole;
N¹-hydroxymethyl-7-bromoindazole;
N¹-hydroxymethyl-7-nitroindazole;
N¹-hydroxymethyl-5,7-dichloroindazole;
N¹-hydroxymethyl-3,5,7-trichloroindazole;
N¹-hydroxymethyl-5,7-dinitroindazole;
N¹-chloromethyl-3,7-dichloroindazole;
N¹-bromomethyl-3,5,7-tribromoindazole;
N¹-iodomethyl-3,5,7-triiodoindazole;
N¹-fluoromethyl-3,5,7-trifluoroindazole;
N¹-thiocyanatomethyl-6,7-dinitroindazole;
N¹-thiocyanatomethyl - 3,5,7 - trichloroindazole, and the like.

The novel compounds of this invention may be prepared by any suitable and convenient procedure. For example, the N¹-hydroxymethyl compounds can be prepared by heating the appropriate 7-substituted indazole with formaldehyde or with a compound such as paraformaldehyde that serves as a source of formaldehyde. The N¹-hydroxymethyl compounds may be heated with a thionyl halide to form the N¹-halomethyl compounds. Reaction of the N¹-halomethyl compounds with potassium thiocyanate yields the N¹-thiocyanatomethyl compounds. The preparation of these compounds is generally carried out in a solvent, such as benzene, toluene, xylene, acetone, pyridine, ethanol, tetrahydrofuran, or ethylene chloride, at the reflux temperature of the reaction mixture.

The N¹-substituted indazoles of this invention can be used to prevent or inhibit the growth of a wide variety of fungi, bacteria, plants, and insects. They are of particular value as preservatives for aqueous compositions that contain organic material that is ordinarily subject to spoilage resulting from the action of bacteria and other microorganisms, such as latex paints, emulsified cutting oils, adhesives, hydraulic fluids, pulp dispersions used in paper making, and cosmetic soaps, creams, and lotions. Aqueous compositions that contain as little as 0.10 percent by weight of one or more of these biocidal compounds are stable and do not show signs of degradation resulting from bacterial activity after storage at room temperature for six months or more. Three percent or more of the biocidal compounds can be used, but these larger amounts do not provide further improvement in the properties of the compositions and for this reason are not usually used. It is generally preferred to incorporate 0.2 percent to 0.4 percent by weight of one of the $N^1$-substituted indazoles of this invention into aqueous compositions to protect them from attack by bacteria and other microorganisms.

In a preferred embodiment of this invention, the $N^1$-substituted indazoles are used as the preservative in aqueous surface-coating compositions, and particularly in surface-coating compositions that are aqueous dispersions that contain about 10 percent to 60 percent by weight of a water-insoluble linear addition polymer and/or an oleoresinous binder. The aqueous dispersions of synthetic linear addition polymers are ordinarily prepared by the emulsion polymerization of ethylenically-unsaturated compounds, especially those of monoethylenically-unsaturated character, although butadiene, chlorobutadiene, and isoprene may be used to some extent. Illustrative of the synthetic linear addition polymers that can be used as the resinous binder in the aqueous dispersions are polyvinyl acetate; polyvinyl butyrate; polyvinyl chloride; copolymers of vinyl acetate with acrylonitrile; copolymers of vinyl chloride with vinyl acetate or vinylidene chloride; polyethylene; polyisobutylene; polystyrene; copolymers of styrene with maleic anhydride or butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; and mixtures thereof. Suitable oleoresinous binders include drying oils, such as linseed oil, tung oil, soybean oil, dehydrated castor oil, safflower oil, or fish oil, bodied drying oils; blends of drying oils or bodied drying oils with a resin component such as limed rosin, an ester gum, or phenolic resin; oleoresinous varnishes formed by heating one of the aforementioned resins with one or more drying oils or bodied drying oils; alkyd resins, which are resinous products resulting from the reaction of a polyhydric alcohol, such as pentaerythritol or glycerol, with a dicarboxylic acid, such as phthalic anhydride, and fatty acids; and mixtures thereof.

In addition to the resinous binder and the $N^1$-substituted indazole, the surface-coating compositions of this invention may contain various auxiliary materials, such a pigments, extenders, solvents, dyes, defoaming agents, driers, emulsifying agents, dispersing agents, plasticizers, and the like in the amounts ordinarily used for these purposes.

The compounds of this invention may be incorporated into the surface-coating composition by any convenient procedure. For example, they can be combined with pigments and various other components to form a pigment phase that is then mixed with the resinous binder and water or an organic solvent to form the surface-coating composition. Alternatively, they can be added to a composition that contains the resinous binder, pigment, and water or organic solvent. The biocidal compound can be added as such to the other components of the surface-coating composition, or they can be added as a solution in an alcohol, ether, ketone, or other solvent.

The $N^1$-substituted indazoles can also be used as agricultural pesticides. They can, for example, be applied to plants or to soil in which plants are growing to control the growth of various plant pathogens without causing visible injury to the plants.

The invention is further illustrated by the following examples.

EXAMPLE 1

A mixture of 38.2 grams (0.25 mole) of 7-chloroindazole, 150 grams of isopropanol, 11.2 grams (0.36 mole) of 97 percent paraformaldehyde, and 0.50 gram (0.006 mole) of 50 percent sodium hydroxide solution was heated at its reflux temperature (83° C.) for one hour during which time an additional 0.55 gram (0.007 mole) of 50 percent sodium hydroxide solution was added to it. The reaction mixture was acidified with hydrochloric acid and then diluted with 85 grams of water. It was then cooled and filtered. The product was washed with 35 grams of 70 percent aqueous isopropanol and dried at 40° C. under reduced pressure. There was obtained 34.6 grams (76.0 percent yield) of $N^1$-hydroxymethyl-7-chloroindazole that melted at 115.5°–118.5° C. and that contained 52.1 percent C; 3.8 percent H; 15.5 percent N; and 19.5 percent Cl (calculated for $C_8H_7N_2OCl$: 52.8 percent C; 3.3 percent H; 15.4 percent N; and 19.5 percent Cl).

Infrared analysis confirmed the structure of the product and indicated that it contained only 0.3 percent of 7-chloroindazole.

EXAMPLE 2

A mixture of 43.0 grams (0.25 mole) of 5,7-dichloroindazole, 257 grams (9.86 moles) of 37 percent aqueous formaldehyde solution, and 13.5 grams (0.33 mole) of sodium hydroxide was heated with stirring in an autoclave at 135°–140° C. for two hours during which time the pressure in the autoclave rose to 190–200 p.s.i. After being cooled to 25°–30° C., the reaction mixture was filtered, and the insoluble material was washed with three 60 gram portions of water and then air dried at room temperature to constant weight. There was obtained 45.6 grams (92 percent yield) of $N^1$-hydroxymethyl-5,7-dichloroindazole, that melted at 120°–124° C. and that contained 44.7 percent C; 3.21 percent H; 12.5 percent N; and 30.8 percent Cl (calculated for $C_8H_6N_2OCl_2$: 44.2 percent C; 2.77 percent H; 12.9 percent N; and 32.7 percent Cl). Infrared analysis confirmed the structure of the product and indicated that it contained less than 4 percent of 5,7-dichloroindazole.

The filtrate obtained upon separation of the product from the reaction mixture consisted essentially of aqueous formaldehyde solution. It could be reused in a subsequent reaction after sufficient paraformaldehyde had been added to it to replace the formaldehyde that had reacted and to return it to its original formaldehyde concentration without a significant increase in volume.

EXAMPLE 3

A mixture of 9.0 grams (0.033 mole) of 5,7-dibromoindazole, 100 grams (1.23 mole) of 37 percent aqueous formaldehyde solution, 80 grams of methanol, and 5.0 grams of sodium hydroxide was heated at 80° C. for two hours. The reaction mixture was cooled to 25°–30° C., acidified with hydrochloric acid, and diluted with 600 grams of water. The resulting oily precipitate was allowed to crystallize at 0°–5° C.; it was then isolated, triturated and washed free of acidity with small portions of water, and dried. There was obtained 8.0 grams (80 percent yield) of a tan solid that consisted principally of $N^1$-hydroxymethyl-5,7-dibromoindazole. The product melted at 119–123° C. and contained 51.0 percent Br (calculated for $C_8H_6N_2OBr_2$: 52.3 percent Br).

EXAMPLE 4

A mixture of 21.7 grams (0.1 mole) of $N^1$-hydroxymethyl-5,7-dichloroindazole and 40 ml. (0.55 mole) of thionyl chloride was heated at its reflux temperature for 90 minutes. The solution had become clear after about 30 to 45 minutes heating, and very little hydrogen chloride was being evolved at the end of the heating period. The reaction mixture was then heated at 60° C. under reduced pressure to remove unreacted thionyl chloride. The residue was dissolved in benzene, and the resulting solution was heated at 60° C. under reduced pressure to remove the benzene. There was obtained 23.3 grams of $N^1$-chloromethyl-5,7-dichloroindazole, an oil that contained 43.6 percent chlorine (calculated, 45.2 percent chlorine). The structure of the compound was confirmed by infrared analysis.

EXAMPLE 5

A mixture of 23.8 grams (0.10 mole) of $N^1$-chloromethyl-5,7-dichloroindazole, 7.05 grams (0.0722 mole) of potassium thiocyanate, and 200 ml. of acetone was heated at its reflux temperature for 17 hours. The reaction mixture was allowed to stand overnight at room temperature and then filtered. The solid material that was collected was washed with acetone. The combined filtrate and acetone-wash were heated at 50° C. under reduced pressure to remove the acetone. The residue was dissolved in benzene, the solution was filtered, and the filtrate was heated at 60° C. under reduced pressure to remove the benzene. There was obtained 26 grams of $N^1$-thiocyanatomethyl-5,7-dichloroindazole, which contained 27.9 percent chlorine and 10.3 percent sulfur (calculated, 27.5 percent chlorine and 12.4 percent sulfur).

EXAMPLE 6

A. A polyvinyl acetate latex paint was prepared by mixing together the following materials:

| Material | Parts by weight |
|---|---|
| Water | 481.5 |
| 25% aqueous solution of sodium salt of maleic anhydride/diisobutylene copolymer | 24 |
| Potassium pyrophosphate | 3 |
| Long chain fatty acid alkanolamide | 9 |
| Defoamer | 6 |
| Ethylene glycol | 75 |
| 1¼% aqueous solution of hydroxyethylcellulose | 375 |
| Aqueous emulsion containing 55% of polyvinyl acetate | 1299 |
| Diethyl ether of diethylene glycol | 30 |
| Titanium dioxide | 690 |
| Talc | 345 |
| Calcium metasilicate | 150 |

This paint had the following properties as determined by standard paint testing procedures:

| | |
|---|---|
| Viscosity | K.U. 65 |
| Brookfield viscosity (#4 spindle, 60 r.p.m.) cps | 800 |
| pH | 7.8 |
| Yellowness Index | 3.0 |

B. An acrylic latex paint was prepared by mixing together the following materials:

| Material | Parts by weight |
|---|---|
| Water | 168 |
| Alkyl aryl ether surfactant | 6 |
| 25% aqueous solution of sodium salt of maleic anhydride/diisobutylene copolymer | 27 |
| Defoamer | 12 |
| 2% aqueous solution of hydroxyethylcellulose | 300 |
| Ethylene glycol | 60 |
| Titanium dioxide | 750 |
| Mica (waterground) | 90 |
| Calcium carbonate | 375 |
| Ammonium hydroxide (28%) | 6 |
| Aqueous dispersion containing 46% acrylic ester copolymer (66% ethyl acrylate, 32.5% methyl acrylate, and 1.5% acrylic acid) | 1642 |

This paint had the following properties:

| | |
|---|---|
| Viscosity | K.U. 72 |
| Brookfield Viscosity (#3 spindle, 60 r.p.m.) cps | 1250 |
| pH | 9.2 |
| Yellowness Index | 2.6 |

C. To samples of the paints whose preparation is described above were added either 0.1 percent or 0.4 percent by weight of $N^1$-hydroxymehyl-7-chloroindazole, $N^1$-hydroxymethyl - 5,7 - dichloroindazole, or a comparative biocide, and the treated paints were mixed for 24 hours on a ball mill.

Samples of the treated paints were aged for 4 weeks at either room temperature or at 120° F. During these ageing periods, the paints that contained the biocidal compounds of this invention underwent little change in viscosity, pH, brightness or yellowness.

D. The treated paints whose preparation is described in Example 6C were evaluated by the following procedure:

A mixed bacterial inoculum consisting of *Pseudomonas aeruginosa* ATCC 10145, *Aerobacter aerogenes* ATCC 7256, *Bacillus subtilis*, *Bacillus megsterium*, and *Bacillus lichenoformis* was prepared by incubation of inoculated (0.5 ml.) milk dilution bottles containing 50 ml. of solidified Trypticase-Soy Agar.

After incubation for 18 to 24 hours at 35° C., the cultures were removed from the agar surface, diluted to an appropriate volume in phosphate buffer (0.05 M, pH 7.0), and inoculated into 300 gram portions of the treated paints whose preparation and properties are described in Example 6C. The amount of the culture that was added to the paint was such that the final level of bacteria was between $0.5 \times 10^6$ and $3 \times 10^6$ per gram of paint. After thorough mixing, the paints were incubated at 35° C. under 90 percent relative humidity. At intervals during the incubation, measurements were made of the viability of the bacteria and the viscosity of the paint. The viability test was carried out by adding an aliquot of the paint to Trypticase-Soy Broth, incubating it for 48 hours at 35° C., and then streaking it on a Trypticase-Soy Agar plate. After a 24-hour incubation period at 35° C., the plates were examined for growth along the streak. Neither the paints containing the $N^1$-substituted indazoles or those containing comparative stabilizers (37 percent formaldehyde and phenylmercuric acetate) showed bacterial growth after an incubation period of 12 days.

The viscosity of the paint samples was measured during the incubation period using a Brookfield Viscometer (No. 3 spindle at 60 r.p.m.). The percentage decrease in viscosity of the treated paints during the incubation period serves as an indication of the amount of deterioration that the paints have undergone as the result of bacterial activity. In each case the paints containing the biocidal compounds of this invention suffered less decrease in viscosity during a 21 day incubation period than did untreated paints or paints containing a comparative biocide. For example, the polyvinyl acetate latex paint that contained 0.1 percent by weight of $N^1$-hydroxymethyl-5,7-dichloroindazole lost 19 percent of its initial viscosity in 1 day, 24 percent in 2 days, 30 percent in 5 days, 36 percent in 12 days, and 40 percent in 21 days, whereas the corresponding paint that contained 0.1 percent of 37 percent stabilized formaldehyde lost 11 percent of its initial viscosity in 1 day, 37 percent in 2 days, 44 percent in 5 days, and 54 percent in 21 days, and the untreated paint lost 35 percent of its initial viscosity in 1 day, 50 percent in 2 days, and 67 percent in 5 days. The acrylic latex paint that contained 0.4 percent by weight of $N^1$-hydroxymethyl-5,7-dichloroindazole lost 5 percent of its initial viscosity in 1 day, 5 percent in 2 days, 8 percent in 5 days, 10 percent in 12 days, and 13 percent in 21 days, whereas the corresponding paint that contained 0.4 percent of 37 percent stabilized formaldehyde lost 6 percent in 1 day, 7 percent in 2 days, 8 percent in 5 days, 10 percent in 12 days and 15 percent in 21 days, and the untreated paint lost 17 percent of its initial viscosity in 5 days, 20 percent in 12 days, and 25 percent in 21 days.

Equivalent results were obtained for the paints that contained 0.1 percent or 0.4 percent of N¹-hydroxymethyl-7-chloroindazole.

Each of the other N¹-substituted indazoles disclosed herein can be used in a similar manner to prevent the growth of bacteria in aqueous compositions that contain organic materials that are subject to deterioration by the action of bacteria.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. Compounds that have the structural formula

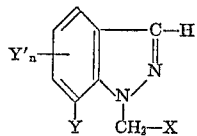

wherein
X represents hydroxyl, halogen, or thiocyanato;
Y and Y' each represents halogen; and
$n$ represents a number in the range of 0 to 1.

2. A compound as set forth in claim 1 wherein X represents hydroxyl.

3. A compound as set forth in claim 1 wherein X represents chlorine.

4. A compound as set forth in claim 1 wherein X represents thiocyanato.

5. The compound as set forth in claim 1 that is N¹-hydroxymethyl-5,7-dichloroindazole.

6. The compound as set forth in claim 1 that is N¹-chloromethyl-5,7-dichloroindazole.

7. The compound as set forth in claim 1 that is N¹-thiocyanatomethyl-5,7-dichloroindazole.

8. The compound as set forth in claim 1 that is N¹-hydroxymethyl-7-chloroindazole.

9. The compound as set forth in claim 1 that is N¹-hydroxymethyl-5,7-dibromoindazole.

References Cited

FOREIGN PATENTS

| 1,568,790 | 4/1969 | France | 260—310 C |
| 2,003,561 | 7/1970 | Germany | 260—310 C |

OTHER REFERENCES

Pozharskii et al.: J. Gen. Chem. (U.S.S.R.), vol. 34, pp. 3409–11.

NATALIE TROUSOF, Primary Examiner

U.S. Cl. X.R.

106—15 R, 15 AF; 260—17 R, 22 R, 23 AC, 23 AR, 23 XA, 23 H, 23 S, 23.7 A, 29.2 R, 29.3, 29.6 XH, 29.6 R, 29.7 R, 29.7 B, 37 R, 45.8 N, 293.6; 424—267, 273